May 14, 1935.     U. C. HAREN ET AL     2,001,572
FEEDING DEVICE
Filed Dec. 7, 1933
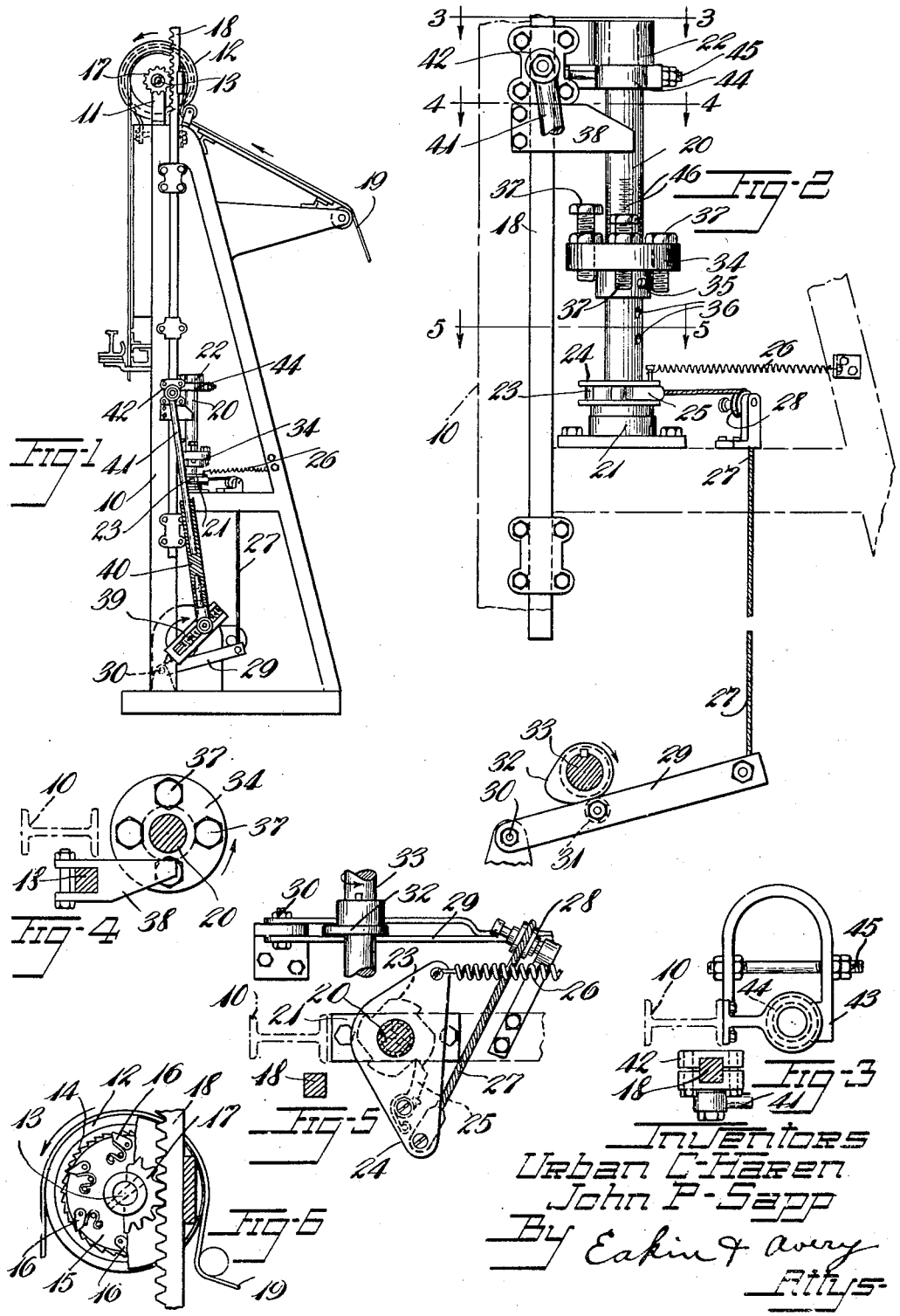
Inventors
Urban C. Haren
John P. Sapp
By Eakin & Avery
Attys.

Patented May 14, 1935

2,001,572

UNITED STATES PATENT OFFICE 2,001,572

FEEDING DEVICE

Urban C. Haren, Akron, and John P. Sapp, Kent, Ohio, assignors to The B. F. Goodrich Company, New York, N. Y., a corporation of New York Application December 7, 1933, Serial No. 701,286

1 Claim. (Cl. 74—117)

This invention relates to a device for advancing a length of material intermittently in unequal steps. The device is especially useful where a plurality of lengths of material are to be cut from an advancing web as in the cutting of plies of rubberized fabric or cord for use in building tires.

In the building of pneumatic tires, the sheet material, comprising rubberized cords or fabric, is cut on the bias to a plurality of widths suitable for use in forming the various plies of the tire. This usually requires setting the feeding device of the cutting machine to produce one ply width and running a days supply of that width, then changing the adjustment and running each other width. It is desirable that the widths be cut in the order of use and conveyed to the builder in succession without booking or otherwise storing the plies as is necessary with the procedure just described.

The present invention has for its principal objects the feeding of material to the cutter in successive unequal steps corresponding to the strips used by the tire builder and in proper order, thereby to reduce cost of manufacture, to avoid delay, and to provide accuracy of operation.

Other objects will appear from the following description and the accompanying drawing.

Of the drawing:

Fig. 1 is a side elevation showing a preferred embodiment of the invention as applied to a well known type of bias cutting machine.

Fig. 2 is a similar view drawn to a larger scale and showing the feeding device of this invention, other parts being broken away.

Fig. 3 is a cross section taken on line 3—3 of Fig. 2 showing the brake.

Fig. 4 is a cross section taken on line 4—4 of Fig. 2, showing the stops.

Fig. 5 is a cross section taken on line 5—5 of Fig. 2, parts being broken away, showing the indexing ratchet mechanism.

Fig. 6 is a detail view showing the feeding rack and pinion and ratchet mechanism of the feed roll, parts being broken away.

Referring to the drawing, the numeral 10 designates one of the frame members of a cutting machine which is provided with a bearing 11 in which is rotatably mounted a fabric-feeding drum 12. Drum 12 is loosely mounted on a shaft 13 and is provided with an internal ratchet 14.

To advance the drum in its feeding motion a disc 15 is keyed to the shaft 13 and carries a plurality of spring pressed pawls 16 adapted to engage the rack when the disc is rotated in one direction. A pinion 17 mounted on shaft 13 is engaged by a rack 18 which has vertical movement as hereinafter described.

The fabric 19 engages the drum throughout a substantial arc and is delivered thereover to any suitable cutting mechanism. A brake (not shown) engages the drum 12 frictionally to prevent undesired overrun or backward movement.

To actuate the rack 18 to provide successive determinate unequal feeding movements the following mechanism is provided. A shaft 20 is mounted vertically and rotatably in bearings 21 and 22 mounted on the machine frame. A ratchet wheel 23 is mounted on the shaft 20. A lever 24 rotatably mounted on the shaft carries a pawl 25 which engages the ratchet wheel. A tension coil spring 26 has one end attached to lever 24 and the other to frame 10. A cord 27 has one end attached to lever 24. The cord passes over a guide pulley 28 and has its other end attached to a lever 29. Lever 29 is pivoted to the frame of the machine at 30 and carries a cam roller 31 which engages a cam 32 on a shaft 33 from which the rack 18 receives its motion. A turret 34 is rigidly mounted on shaft 20 and is held in place by a pin 35 engageable in openings 36 provided at different elevations along the shaft.

A plurality of stops 37 are axially mounted on the turret at equidistant positions thereabout. Each stop is threaded through the turret and is adjustable. An arm 38 is clamped to the rack 18 and extends so as to engage one of the stops 37 at each downward stroke and the cam 32 is timed to shift the turret by the space between two stops between such downward movements of the rack.

In order to move the rack, the shaft 33, which is constantly driven from any source of power (not shown), is provided with an adjustable crank 39. A tubular pitman member 40 is pivoted to the crank. A second pitman member 41 is slidably mounted in the tubular member and is pivoted to a cross-head 42 on the rack 18. When the pitman is under compression forces its telescoping members act as a solid pitman as the part 41 bottoms in the tubular part 40 as shown in Fig. 1, and the rack 18 is moved to its highest position at each stroke, feeding the fabric forward. On the return stroke, the rack follows the pitman under the influence of gravitational force until the arm 38 engages one of the stops 37, whereupon the rack stops while the pitman member 40 continues its movement. On the next upward movement of the pitman member 40, as it reaches the limit of its telescoping movement, it lifts the arm 38 from the stop 37 and the amount that the fabric is fed will depend upon the adjustment of the stop 37.

When stops 37 are adjusted to different elevations, a series of strips of different widths may be cut.

In order to prevent backward rotation or overrunning of the shaft 20, a brake 43 is provided to frictionally engage a collar 44 on the shaft and an adjusting screw 45 is provided to adjust the brake.

To facilitate adjustment of the stops 37 a scale of graduations 46 is provided on the shaft 12.

While the embodiment of the device in its preferred form has been described as applied to a bias cutter, it will be understood that the device may be used wherever material is to be fed intermittently between cutting, punching, or other operations requiring the feeding of the material in determinately different steps.

We claim:

A mechanical movement for actuating a machine element in a series of reciprocal movements of successively different amplitude, comprising a driven crank shaft, a lost motion pitman, means operatively connecting said pitman with said machine element and said crank shaft for advancing the machine element positively in one direction, an abutment fixed to the machine element to limit its return movement, a series of stops arranged to be moved successively into the path of said abutment in paths perpendicular to the direction of movement of said machine element, and means actuated by the crank shaft for advancing the stops in succession.

URBAN C. HAREN.
JOHN P. SAPP.